Dec. 18, 1951     W. P. OEHLER     2,579,086
HYDRAULIC ANGLING MECHANISM FOR DISK HARROW GANGS
Filed April 28, 1945
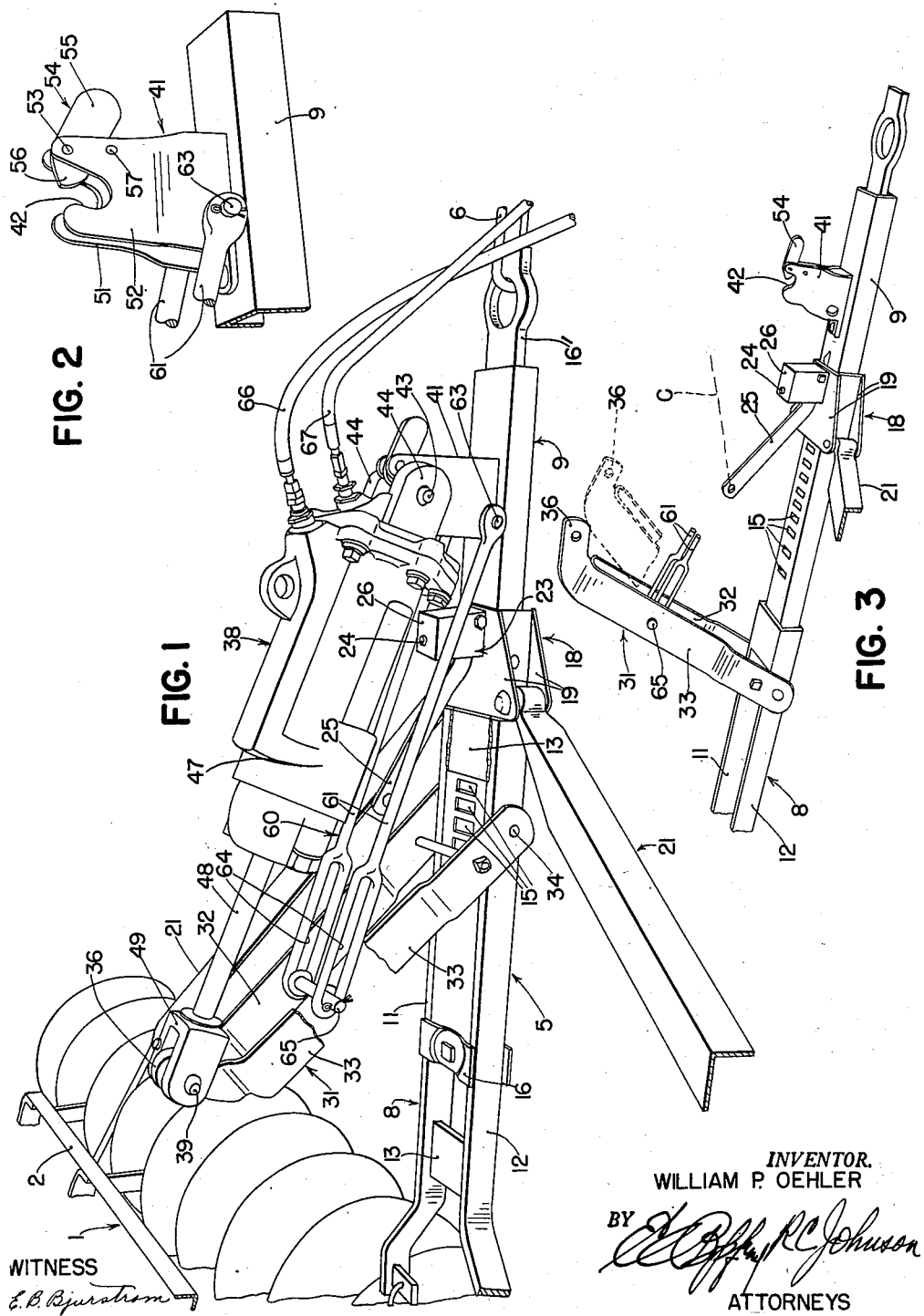
*INVENTOR.*
WILLIAM P. OEHLER
ATTORNEYS Patented Dec. 18, 1951

2,579,086

UNITED STATES PATENT OFFICE 2,579,086

HYDRAULIC ANGLING MECHANISM FOR DISK HARROW GANGS

William P. Oehler, Moline, Ill., assignor to Deere & Company, Moline, Ill., a corporation of Illinois Application April 28, 1945, Serial No. 590,831

12 Claims. (Cl. 55—81)

The present invention relates generally to agricultural implements and more particularly to disk harrows and the like that are adapted to be drawn by a tractor and controlled by a power unit deriving power from the tractor but which may also be controlled manually in the event a power unit is not available.

The object and general nature of the present invention is the provision of a disk harrow having new and improved means for receiving the hydraulic piston and cylinder unit of a hydraulic power lift which normally forms a permanent part of the tractor, the mounting mechanism being arranged to accommodate a quick and easy connection of the hydraulic unit to the implement and a quick and easy disconnection of the hydraulic unit from the implement, thereby facilitating hitching and unhitching the implement to and from the tractor. More particularly, it is a feature of this invention to provide a simple and inexpensive cylinder mounting that is carried substantially wholly on the drawbar structure of the harrow and which is especially adapted to utilize a standard type cylinder having a given amount of extension and to connect the cylinder in such a way as to secure the desired amount of movement of the drawbar members of the harrow that is necessary to angle and straighten it.

It is also a feature of this invention to provide a cylinder mounting mechanism which provides for a limited amount of free movement of one of the cylinder-receiving parts relative to the other, thereby facilitating the attachment of the cylinder. Still further, another feature of this invention is the provision of a cylinder-receiving bracket having novel detent means which, while readily releasable, effectively secures the cylinder to the bracket but which may readily be operated to release the cylinder whenever desired.

These and other objects and advantages of the present invention will be apparent to those skilled in the art after a consideration of the following detailed description, taken in conjunction with the accompanying drawings in which the preferred form of the invention has been illustrated.

In the drawings:

Figure 1 is a perspective view of a disk harrow in which the principles of the present invention have been incorporated.

Figure 2 is a fragmentary perspective showing the cylinder-receiving bracket structure which detachably receives the hydraulic piston and cylinder unit.

Figure 3 is a view similar to Figure 1 but showing the parts in the positions they occupy when the hydraulic cylinder is removed and the disk harrow controlled manually.

Referring now to the drawings, the disk harrow which has been chosen to illustrate the principles of the present invention incorporates a pair of disk gangs 1, each having a scraper frame 2, the gangs being connected together at their inner ends for swinging in a generally horizontal plane into and out of straightened and angled positions. It will be understood that when the gangs 1 are in their straightened position they are arranged for transport and that when they are in an angled position they are arranged for operation. The disk harrow is adapted to be propelled by any suitable propelling means, preferably a tractor (not shown) to which the drawbar structure 5 of the disk harrow is connected, as by a clevis 6 or other suitable means.

The drawbar means of the disk harrow comprises a pair of relatively slidable or telescopically associated members 8 and 9, the former being connected at its rear end to the inner ends of said gangs 1 and preferably taking the form of a pair of angle members 11 and 12 connected together by any suitable means, such as spacers 13, in laterally spaced apart relation. The front spacer 13 serves as a stop, and will be referred to below in detail, for the rear end of the other drawbar member 9, which preferably is in the form of a channel having a plurality of apertures 15 therein and a stop plate 16 bolted to the rear end of the channel 9. The forward end of the channel receives a hitch bar 16' which is apertured to receive the clevis 6. A slide member 18 is mounted on the drawbar channel 9 and is provided with lateral ears 19 which are apertured to receive pins by which the forward ends of a pair of draft links 21 are pivotally connected to the slide member 18. The draft links 21 are connected at their rear ends to the ends of the disk gangs 1. The slide 18 carries a latch structure 23 thereon, which includes a plunger 24 and a spring biased trip lever 25 mounted in a support 26 fixed to the upper plate of the slide 18. The outer end of the trip arm 25 is apertured to receive a cable or operating rope which, when pulled forwardly, serves to raise the plunger 24 out of engagement with one of the openings 15 in the drawbar channel 9.

For receiving the cylinder of a hydraulic unit, I provide a swinging or pivoted arm 31, preferably made up of a pair of bars 32 and 33 which at their lower ends are pivoted, as at 34, to the front portion of the rear drawbar member 8.

The arm or lever 31 extends generally upwardly, and at their upper ends the bars 32 and 33 are brought together to form an apertured lug 36 to which one end of the hydraulic piston and cylinder unit 38 may be connected in any suitable way, as by a quick detachable pin 39.

Mounted on the forward end of the drawbar channel 9 is a bracket 41 that is made up of a plate bent into U-shape and notched, as at 42, to receive a pin 43, which may be like the pin 39 mentioned above, carried in a pair of apertured lugs 44 forming a part of the cylinder unit 38. The latter preferably comprises a cylinder proper, as shown at 47, and a piston rod 48 which at its rear end terminates in a yoke 49 apertured to receive the quick detachable pin 39. The two sides 51 and 52 of the brackets 41 are formed so as to provide the notch mentioned above, and the two side portions are apertured to receive a pin 53 on which a detent 54 is swingably mounted. The detent is of the weighted or over balanced type, including the weighted end 55 and a cylinder-locking nose section 56. A pair of apertures are formed in the bracket sides 51 and 52 to receive a pin 57 which forms a stop for the weighted detent 54 and thus determines the cylinder-locking position of the detent, as best shown in Figure 2. The cylinder 38 may readily be attached to the bracket 41 by pressing the pin 43 downwardly into the notch 42, momentarily swinging the detent 54 upwardly so that the nose 56 moves downwardly and accommodates the passage of the pin 43 of the cylinder 38 into a seating position in the notch 42, whereupon the nose section 56 clears the pin and the detent 54 swings down into its locking position, as shown in Figure 2. The surface of the detent nose section 56 that engages the cylinder pin 43 is so shaped that it bears against the pin at such an angle that the detent resists any tendency for the pin to inadvertently move out of the notch 42, yet the cylinder may readily be removed from the bracket 41 merely by lifting the detent 54 so as to swing the nose section 56 downwardly and away from the pin, freeing the latter. The removal of the cylinder 38 from the mounting means supporting the same on the harrow drawbar is completed by removing the quick detachable pin 39 and thus disconnecting the piston rod from the upper end of the lever 31.

In order that operation of the cylinder 38 may be effective to shift the drawbar members 8 and 9 relative to each other, an anchoring link 60 is provided. Preferably, the anchoring link comprises a pair of rods 61, each pivoted, as at 63, to the bracket 41 or to an adjacent portion of the channel 9, and at its rear end each of the rods 61 is provided with a slot 64 through which a pin 65 carried by the side bars 32 and 33 of the lever 31 passes. A pair of hose lines 66, 67 lead from the cylinder 38 to a controlled source of fluid pressure on the tractor. The hydraulic unit 38 is of the double acting type and is arranged so that fluid under pressure may be directed through one of the hose lines into one side of the cylinder and the fluid at the other side of the cylinder is discharged back to the tractor through the other hose line. By operating the hydraulic controls the piston and cylinder unit may be extended or retracted by power, as desired.

Referring to Figure 1, if, for example, power is delivered to the hydraulic unit 38 to extend the same, the arm or lever 31 is caused to swing so that, reacting through the links 61 against the front end of the drawbar channel 9, the lower end of the arm or lever 31 shifts the drawbar member 8 forwardly relative to the forward drawbar member 9, this movement occurring until the front end of the member 8 engages the slide 18, which limits further collapsing or telescoping movement. This brings the disk gangs 1 into their straightened or transport position. In order to cause the disk gangs 1 to go into angle, all that it is necessary to do is to direct fluid under pressure into the rear end of the cylinder 38, thus causing the lever 31 to be swung in the other direction. Due to the slots 64, this movement of the cylinder 38 does not forcibly move the gangs into their angled position, but they do move into their angled position by virtue of soil pressure acting against the disks when the outfit is moved forwardly. The purpose of the slots 64 is to accommodate the ready attachment and detachment of the cylinder unit 38. This may be done readily since the pins 39 and 43 may be easily brought into position by a limited amount of manual movement of the arm 31, as permitted by the slots 64. If the slots 64 were not provided, it would be necessary to exercise extreme care in order to extend the cylinder 38 to exactly the right amount so as to bring the pin 39 opposite the openings in the lug 36 at the same time that the pin 43 is disposed in exactly the right position to enter the notch 42. However, the slots 64 permit a certain amount of free movement of the arm 31, and hence the attachment of the cylinder 38 is facilitated since all that is is necessary to do in attaching the cylinder 38 is to swing the lever 31 manually, after seating the pin 43 in the notch 42, until the opening in the lug 36 moves into a position registering with the openings in the yoke 49, whereupon the quick detachable pin 39 may readily be reconnected in place.

Figure 3 shows the parts when the cylinder unit 38 is entirely detached therefrom, and with a cable C connected to the outer end of the latch lever 25 for operating the latter by a pull exerted on the cable C. Figure 3 also shows the parts in the positions they may be in when reattaching the unit 38. From this figure it will be clear how the arm 31 may, by virtue of the slots 64, be swung manually into different positions in order to register the opening in the outer end of the arm 31 with the openings in the yoke 49 through which the pins 39 may extend. The fluid directed to the cylinder will then swing the arm 31 into a position with its lower end substantially up against the slide 18, as illustrated in Figure 1.

While I have shown and described above, the preferred structure in which the principles of the present invention have been incorporated, it is to be understood that my invention is not to be limited to the particular details shown and described above, but that, in fact, widely different means may be employed in the broader aspects of my invention.

What I claim, therefore, and desire to secure by Letters Patent is:

1. In a disk harrow, a pair of relatively movable parts connected, respectively, with the disk gang of the harrow for changing the angle of the latter by relative movement between said parts, a piston and cylinder unit connected with one of said parts, a lever pivotally connected at one end with the other of said parts, means connecting the other end of said piston and cylinder unit with the other end of said lever, and means providing a fulcrum against which said lever reacts when said piston and cylinder unit is operated for shifting one of said parts relative to the other, said fulcrum means including an anchoring link connecting an intermediate portion of said lever with said one part, whereby extension and retraction of said piston and cylinder unit serves to shift one of said parts relative to the other.

2. In a disk harrow, a pair of telescopically associated members, means connecting one of said members with one end portion of a disk gang, means connecting the other of said members with the other end portion of said disk gang, an arm pivotally mounted on one of said members and swingable relative thereto, a bracket fixed to the other of said members, a hydraulic piston and cylinder unit detachably connected between said bracket and the other end of said swingable arm, and a link connecting the intermediate portion of said arm with said other member whereby extension and retraction of said piston and cylinder unit acts to shift said telescopically associated members, one relative to the other.

3. In a disk harrow, a disk gang, a pair of relatively slidable members connected, respectively, with opposite end portions of said disk gang, an arm swingably connected with one of said members and carrying cylinder-receiving means at its free end, a hydraulic piston and cylinder unit releasably connected with said swinging end of said arm, a bracket carried by the other of said members, means releasably connecting the other end of said cylinder unit with said bracket, an anchoring link connected between said other member and the intermediate portion of said arm, whereby, when said piston and cylinder unit is operated, said arm serves as a lever for shifting said one member relative to the other member, and means providing for movement of said arm relative to said link in at least one direction, when said piston and cylinder unit is detached from said arm and bracket, to facilitate reattaching said unit thereto.

4. A tractor disk harrow, comprising a disk gang, drawbar means connecting said gang with the tractor and including two parts, one mounted for movement on the other, means connecting said parts with the opposite end portions of said disk gang whereby relative movement between said parts serves to change the angle of said gang, a hydraulic power unit operatively connected at one end with said other part, a lever pivotally connected at one end with and carried on said one part, means connecting the other end of said hydraulic power unit with said lever at a point above the connection of said lever with said one part, and means providing a fulcrum against which said lever reacts when said power unit is operated for shifting one part relative to the other, said fulcrum means including a link connected at its forward end with the forward portion of said other part and at its rear end with said lever at a point above its lower end and spaced from the connection between said power unit and said lever.

5. A disk harrow comprising a disk gang, drawbar means including relatively slidable parts, means connecting one of said parts with one end portion of said gang, means connecting the other end portion of said gang with the other of said parts including a slide mounted on said other part and latch means on said slide releasably connecting the latter with said other part whereby, when said latch connects said slide with said other part, relative movement between said parts serves to change the angle of said gang, an extensible and retractable power unit, one of said parts extending forwardly beyond the other, means connecting the forward end of said power unit with the forward portion of the last mentioned one of said relatively slidable parts, and means connecting the rear end of said power unit with the forward portion of the other part for changing the angle of said gang by power so long as said latch connects said slide with said other part, release of said latch serving to accommodate a change in the angle of said gang independent of said power unit.

6. A tractor disk harrow comprising a disk gang, drawbar means connecting said gang with the tractor and including two parts mounted for movement, one with respect to the other, and operatively connected, respectively, with the end portions of said gang whereby movement of one part relative to the other serves to change the angle of said gang, a lever pivoted at one end to one of said parts, a bracket mounted on the other of said parts, a power unit connected with said bracket and said lever at a point spaced from said one end thereof, and fulcrum means for said lever forming the pivot about which said lever swings when said power unit is operated, said fulcrum means including a link extending from said bracket to said lever at a point spaced along said lever from said above mentioned point, whereby operation of said power unit serves to swing said lever and move one of said parts relative to the other.

7. A tractor disk harrow comprising a disk gang, drawbar means connecting said gang with the tractor and including two parts mounted for movement, one with respect to the other, and operatively connected, respectively, with the end portions of said gang whereby movement of one part relative to the other serves to change the angle of said gang, a lever pivoted at one end to one of said parts, a bracket mounted on the other of said parts, a detachable power unit detachably connected with said bracket and the other end of said lever, a link pivotally connected at one end with said other part, means associated with the other end of said link and forming a slotted connection with the intermediate portion of said lever, whereby movement of the latter away from said bracket power unit reacts against the link for shifting said parts and bringing said disk gang into straightened position, said lever being movable freely toward said bracket by virtue of said slot connection to facilitate attaching said power unit to said bracket and lever.

8. A tractor disk harrow comprising a disk gang, drawbar means connecting said gang with the tractor and including two relatively movable parts, means connecting one of said parts with one end of said disk gang, and means including a slide on the other part and means connecting said slide with the other end of said disk gang, a latch on said slide for releasably locking the same to said other part, said slide being adapted to be fixed by said latch in different positions along said other part, and said one part being shiftable relative to said other part into a position engaging said slide when said disk gang is in a straightened position, an arm pivoted to said one part, a power unit connected between the other part and the other end of said arm, and an anchoring connection between the intermediate portion of said arm and said other part whereby operation of said power unit is adapted to act through said arm for shifting said one part into a position engaging said slide, movement of the power unit in the other direction permitting said one end of said disk gang and said one part to shift rearwardly into an operating position, and stop means defining the rearward position of said one part relative to said other part.

9. The invention set forth in claim 8, further characterized by said latch being releasable to permit the other end of said disk gang and said slide to shift rearwardly relative to said other part for also straightening said gang independent of said power unit.

10. A tractor disk harrow comprising a disk gang, drawbar means including a pair of relatively shiftable members, means connecting one of said members with one end of said gang, and means including a slide and latch thereon shiftable relative to the other member for connecting the latter with the other end of said gang, said latch including a latch lever, a power operated unit, means detachably connecting said power operated unit with said members for detachably mounting said unit thereon substantially directly over said latch and operatively connecting said power unit to shift said members, said latch including a trip lever shaped to clear said power unit when the latter is mounted on said members.

11. In a disk harrow, a pair of telescopically associated members, means connecting one of said members with one end portion of a disk gang, means connecting the other of said members with the other end portion of said disk gang, an arm pivotally mounted on one of said members and swingable relative thereto, a bracket fixed to the other of said members, a hydraulic piston and cylinder unit connected at one end with said bracket and at the other end with said arm at a point spaced from its pivotal support on said one member, and a floating fulcrum against which said arm reacts when said unit is operated, comprising a link pivotally connected at one end with said other member and at the other end with said arm at a point thereon spaced from the point at which said unit is connected therewith.

12. In a disk harrow including a disk gang, drawbar means including relatively slidable parts, means connecting one of said parts with one end portion of said gang, and means connecting the other end portion of said gang with the other of said parts including a slide mounted on said other part and latch means on said slide releasably connecting the latter with said other part whereby, when said latch connects said slide with said other part, relative movement between said parts serves to change the angle of said gang, the combination therewith of an extensible and retractable power unit, a lever adapted to be pivotally mounted on said one part, fulcrum means for connecting said lever with said other part, and means for detachably connecting opposite ends of said power unit with said lever and said other part for shifting the latter part relative to said one part by power, said relative shifting movement acting through said slide and latch for changing the angle of said gang, and means for limiting the amount of extension of said relatively slidable parts, whereby when said parts are so extended, said latch may be released to provide for movement of said slide along said other part for changing the angle of said gang independently of said power unit.

WILLIAM P. OEHLER.

REFERENCES CITED

The following references are of record in the file of this patent:

UNITED STATES PATENTS

| Number | Name | Date |
|---|---|---|
| Re. 22,225 | Hornish | Nov. 24, 1942 |
| 1,191,762 | Conant | July 18, 1916 |
| 2,292,961 | Mott | Aug. 11, 1942 |
| 2,303,325 | Cheek | Dec. 1, 1942 |
| 2,319,458 | Hornish | May 18, 1943 |
| 2,338,698 | White | Jan. 11, 1944 |
| 2,392,018 | White | Jan. 1, 1946 |
| 2,402,682 | Shriro et al. | June 25, 1946 |
| 2,426,498 | Franklin | Aug. 26, 1947 |